(12) United States Patent
Haymore et al.

(10) Patent No.: US 6,346,241 B1
(45) Date of Patent: Feb. 12, 2002

(54) ANIMAL FEEDSTOCK CONTAINING SHREDDED TIRES

(76) Inventors: Charles P. Haymore, 423 Burr Rd., San Antonio, TX (US) 78209; Adam Heller, 5317 Valburn Cir., Austin, TX (US) 78731

(*) Notice: Subject to any disclaimer, the term of this patent is extended or adjusted under 35 U.S.C. 154(b) by 0 days.

(21) Appl. No.: 09/351,748

(22) Filed: Jul. 8, 1999

Related U.S. Application Data

(60) Provisional application No. 60/139,827, filed on Jun. 21, 1999.

(51) Int. Cl.[7] .......................... A61K 31/74; A23K 1/18; A23K 1/17
(52) U.S. Cl. ..................... 424/78.01; 424/438; 424/442; 424/78.31; 426/635; 426/807
(58) Field of Search ........................... 424/78.08, 78.01, 424/438, 442, 78.31; 426/635, 807

(56) References Cited

U.S. PATENT DOCUMENTS 3,876,793 A    4/1975  Salvesen et al. ............... 424/83
3,976,766 A    8/1976  Salvesen et al. ............... 424/83
4,914,144 A  * 4/1990  Muehlbach et al. ........ 524/139

FOREIGN PATENT DOCUMENTS

| EP | 484826 | * | 5/1992 |
| JP | 55043161 | * | 3/1980 |
| JP | 04351606 | * | 12/1992 |
| JP | 408225403 | * | 9/1996 |

OTHER PUBLICATIONS

Peter R. Cheeke, *Natural Toxicants in Feeds, Forages, and Poisonous Plants*, Second Edition (c) 1988, pp. 71–72,147, 103,192,252,306–310,327–328,333,334,352,389.

* cited by examiner

*Primary Examiner*—David M. Naff
*Assistant Examiner*—Mike Meller
(74) *Attorney, Agent, or Firm*—Michelle L. Evans; Gunn, Lee & Keeling

(57) ABSTRACT

A feedstock for feeding to animals is disclosed. The feedstock contains a mixture of feed for animals and shredded tires. Also disclosed is a method of using the feedstock to improve digestive efficiency and control harmful and toxic plants.

1 Claim, No Drawings

ANIMAL FEEDSTOCK CONTAINING SHREDDED TIRES

Applicant claims priority under 35 U.S.C. §119 of U.S. Provisional Application Serial No. 60/139,827 filed Jun. 21, 1999.

BACKGROUND OF THE INVENTION

1. Field of The Invention

Applicant's invention relates to a feedstock for herbivores and the method of using the feedstock to improve digestive efficiency and control harmful and toxic plants. Specifically, this invention relates to inexpensive additives which can be added to feedstock and fed to ruminants, e.g. goats, deer, and cattle, to absorb or adsorb defensive organic plant chemical compounds.

2. Background Information

Members of the family of woody plant weeds commonly called cedars or junipers have spread over a substantial part of the North American continent. These weeds deprive the soil of nutrients that would be available to other plants, such as forbs and grasses, on which domesticated animals as well as wild animals, such as deer, feed. These weeds are also a major source of allergens caused in the Southwest part of the United States. One cause for the spreading of these weeds is that herbivores, particularly ruminants, whether domesticated or wild, do not adequately feed on them. The animals are repelled from feeding on junipers because of their defensive organic constituents. For example, female goats that feed on most plants and trees do not consume substantial quantities of junipers because of their defensive chemicals. It is hypothesized that the chemicals may, for example, upset the delicate balance of microorganisms in the herbivore's stomach. It has also been hypothesized that some examples of the defensive compounds are terpenes. There are other mechanisms by which defensive chemicals may act.

Examples of junipers growing in the Southwest United States containing defensive organic compounds are: Rocky Mountain Juniper; Western Juniper; One Seed Juniper; Utah Juniper; California Juniper; Alligator Juniper; Pinchot Juniper; Ashe Juniper; Weeping Juniper; and Eastern Red Cedar. Similar chemical defense compounds against grazing animals are found also in other plants, such as creosote-bush, larkspur, western bitterweed, woolly paperflower, mustards, spurges, agarito, perennial snakeweed, and oaks. The oil or solvent soluble chemical constituents in other plants which repel, sicken or kill grazing animals should also be absorbed by or be adsorbed onto the polymers. Examples of these compounds are terpenes, diterpenoid alkaloids, organic thiocyanates, sesquiterpenoid lactones, tesinoids, resins, tannins, and creosotes. It is recognized that activated charcoal will also absorb some of these compounds and provide relief from their toxic symptoms.

It is well known that oil or solvent soluble organic compounds, including mono, di, tri and tetraterpenes, and their derivatives can be absorbed or adsorbed by polymers. The rate of absorption is determined usually by the surface area contacting the oil and by the rate of permeation of the oil into the polymer. The available surface area can be readily increased by shredding the polymer. This increases the rate of uptake, whether by absorption or by adsorption bringing it to within a period comparable to or shorter than the dwelling period of the plant in the rumen and remainder of the digestive system. A specific family of polymers in which permeation rates and therefore absorption rates can be high is the family of elastomers, which are rubbery materials. A source of particularly inexpensive elastomeric materials is the used tire, for example the used automotive tire. Tires may comprise polymers or copolymers of butadiene or isoprene. Such polymers or copolymers may include polyisoprene, polybutadiene, and/or ABS rubber. ABS rubber is a copolymer of acrylonitrile, butadiene, and styrene. Applicant is unaware of any information in the prior art which suggests that these polymers can be combined into a feedstock, as does the present invention. Nor is applicant aware of any prior art that indicates that these polymers can be fed to herbivores to allow them to improve their digestive process and to eat harmful and toxic plants which contain oil or solvent soluble organic compounds, as does the present invention.

Furthermore, it is known in the prior art that ruminants can be fed water insoluble water swellable polymers to absorb acid conditions in the rumen resulting from the ingestion of prepared foods, e.g. silage, but not open pasture. U.S. Pat. No. 5,004,603. However, applicant is unaware of any prior art that suggests that a nonwater-swellable as well as nondigestable polymer, such as in the present invention, can be used to absorb harmful plant chemicals in the gut of the herbivore.

Presently, there do not appear to be any polymer compositions available on the market that act as feedstocks for herbivores to absorb oil or organic solvent soluble chemicals from plants, for instance to aid ruminants in eating cedar and juniper. The present feedstock can be fed to an herbivore so as to absorb or adsorb the harmful chemicals in the herbivore's digestive system thereby allowing the herbivore to digest its food more efficiently and eat more of the harmful, and potentially toxic, plant. This feedstock can therefore also be used as a means to control harmful and toxic plants.

SUMMARY OF THE INVENTION

It is an object of the present invention to provide a feedstock which contains organic polymers which absorb or adsorb harmful plant oil or solvent soluble organic compounds in the digestive system of an herbivore.

It is still another object of the present invention to provide a feedstock which contains organic polymers which absorb or adsorb harmful plant oil or organic solvent soluble organic compounds in the rumen of a ruminant.

It is another object of the invention to absorb in the digestive tract of herbivore volatile oils and other organic oil or solvent soluble chemicals which interfere with the digestive process thereby improving digestive efficiency generally.

It is another object of the present invention to provide a feedstock for use in controlling harmful and toxic plants.

It is another object of the present invention to provide a method of using a feedstock to control harmful and toxic plants.

It is an object of the present invention to provide a feedstock to aid herbivores in eating harmful and toxic plants.

It is another object of the present invention to provide a feedstock which contains elastomers.

It is yet another object of the present invention to provide a feedstock which contains organic polymers which are excreted intact by the herbivore.

It is a further object of the present invention to provide a feedstock which contains a polymer or copolymer of butadiene or isoprene.

It is another object of the present invention to provide a feedstock which contains polyisoprene, polybutadiene, and/or ABS rubber.

It is still another object of the present invention to provide a feedstock for use in absorbing or adsorbing harmful plant oil or solvent soluble organic compounds in the digestive system of an herbivore.

It is a further object of the present invention to provide a feedstock for use in absorbing or adsorbing plant terpenes, thiocyanates, terpine derivatives, resins, resinoids, tannins, diterpenoid alkaloids, sesquiterpenoid lactones, and creosotes.

It is still a further object of the present invention to provide a feedstock which contains organic polymer absorptive or adsorptive materials which absorb terpenes, organic thiocyanates, plant resins, resinoids, plant tannins, diterpenoid alkaloids, sesquiterpenoid lactones, plant creosotes, and large aldehydes and ketones.

It is yet another object of the present invention to provide a feedstock which can be used to control allergens released from harmful and toxic plants.

It is another object of the present invention to provide a feedstock which can be fed to herbivores to aid them in eating more classes of indigenous plants thereby controlling pasture overgrazing problems.

It is another object of the invention to aid the digestion of herbaceous materials originating from both prepared feeds and open pasture.

It is still another object of the present invention to provide a feedstock which can be fed to a ruminant without harming the delicate microorganisms in its rumen.

It is a further object of the present invention to provide a use for old tires.

In satisfaction of these and related objectives, Applicant's present invention provides such a feedstock and method of using the feedstock to improve digestive efficiency and control harmful and toxic plants.

DETAILED DESCRIPTION OF THE PREFERRED EMBODIMENT

Certain plants produce defensive chemical repellants which are often soluble in, and extracted by, organic solvents. These defensive chemical repellants are less soluble in water. These organic-phase soluble compounds act to reduce the feeding of herbivores, particularly ruminants, on some plants. These defensive chemicals can be, but are not limited to, members of the terpenes, such as monoterpenes, diterpenes, triterpenes, sesquiterpenes and tetraterpenes; diterpenoid alkaloids; sesquiterpenoid lactones; thiocyanates; resins; resinoids; tannins; and creosotes. They may consist, for example, of hydrocarbons, aldehydes, ketones and alcohols with 5, 10, 15 or 20 carbon atoms. They may comprise branched or cyclic alkenes, aldehydes, alcohols and other compounds. Most organic chemistry textbooks provide examples of these compounds. The compounds may selectively repel, through their odor, taste, or interference with digestion, the grazing animal species, and within a particular species, animals of a particular sex.

It was discovered that when automotive tires were shredded to minute particles or chips, and were included in the dietary supplement of domesticated animals, particularly female goats, the animals intensely harvested the juniper. In addition, it has been observed that cattle on central Texas winter range consuming this feedstock without protein or energy supplementation attain and maintain better body condition on smaller pasture areas than cattle not consuming this feedstock but receiving protein and energy supplementation. While particles smaller than about 1/32 of an inch in diameter are most effective, larger particles of diameters of less than 1/8 of an inch, are also useful. In order to cause the animals to consume the shredded tires, the particles are mixed with salt, mineral mix, supplemental feed, water, or molasses. Any feed additive carrier which is attractive to the animal can be used. It is desirable to use high surface to volume ratio particles of the polymer or elastomer comprising material of the tires, the surface to volume ratio exceeding 24 in$^{-1}$, more preferably exceeding 100 in$^{-1}$ and most preferably exceeding 200 in$^{-1}$.

Although many different organic polymer comprising materials can be used, the preferred materials comprise elastomers. Examples of elastomers found in tires include polyisoprene, polybutadiene, and ABS rubber, a copolymer of acrylonitrile, butadiene and styrene. These and other elastomeric materials are permeable to, and absorb, oil or solvent soluble organic compounds from plants, including terpenes. The materials absorb at least 0.01% by weight, preferably more than 0.1% by weight, and most preferably more than 1% by weight of at least one member of the group of test compounds comprised of menthol, an alcohol; camphor, a ketone; and a-pinene, an olefin. The materials can also absorb beta-pinene, carvone, and terpineol. The material is then excreted by the animal intact.

The feeding behavior of two groups of free ranging female goats was studied. Both groups were fed a mineral supplement consisting of salt and a combination mineral supplement. One group was fed the mineral supplement in addition to shredded automotive tires of an average particle size of finely ground pepper. The second group did not receive the shredded automotive tires. The group of goats, which did not receive in its mineral supplement the shredded tires, rejected the abundant Texas juniper in the pasture. The group that did receive the shredded tires intensely consumed the juniper. Furthermore, goats and cattle supplemented with ground tires attained excellent body condition during the winter in central Texas without any feeding of cottonseed meal, hay or corn. However those animals which did not receive the shredded tires in their mineral supplement required additional cottonseed meal, hay or corn to maintain good body condition.

It is believed that this increased consumption of harmful plants as seen in goats would be similar in cattle. Although some species contain more than others, it is believed that substantially all herbaceous plants contain some defensive organic compounds which interfere with digestion by herbivores. To the extent the defensive organic compounds are oil or solvent soluble, they should be absorbed by this feedstock. For example, decaying grass produces hexenyl acetate, hexenal, butanone, and acetone which should be absorbed by this feedstock. It has been observed that cows do not eat leafy spurge or larkspur because the plants are toxic to the cattle. In many instances a range has been abandoned because of the leafy spurge, for instance, taking over the area. It is believed that the present invention would be useful in this particular situation to aid the cattle in consuming these toxic plants.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A feedstock for feeding to animals, said feedstock comprising a mixture of feed for animals and shredded tires.

* * * * *